US010826589B2

(12) United States Patent
Davydov et al.

(10) Patent No.: US 10,826,589 B2
(45) Date of Patent: *Nov. 3, 2020

(54) CHANNEL STATE INFORMATION (CSI) REPORTING FOR BANDWIDTH PARTS

(71) Applicant: Apple Inc., Cupertino, CA (US)

(72) Inventors: Alexei Davydov, Nizhny Novgorod (RU); Victor Sergeev, Nizhny Novgorod (RU); Dmitry Dikarev, Nizhny Novgorod (RU)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,031

(22) Filed: May 9, 2019

(65) Prior Publication Data
US 2019/0363772 A1 Nov. 28, 2019

Related U.S. Application Data

(63) Continuation of application No. 16/147,204, filed on Sep. 28, 2018, now Pat. No. 10,601,483.
(Continued)

(51) Int. Cl.
H04B 7/06 (2006.01)
H04W 72/04 (2009.01)
(Continued)

(52) U.S. Cl.
CPC ......... H04B 7/0626 (2013.01); H04B 7/0469 (2013.01); H04B 7/0639 (2013.01);
(Continued)

(58) Field of Classification Search
CPC ...... H04B 7/06; H04B 7/0456; H04B 7/0639; H04B 7/0469; H04B 7/0626; H04L 5/00; H04L 5/0057; H04L 5/0094; H04W 24/10; H04W 72/04; H04W 72/0446; H04W 72/042
See application file for complete search history.

(56) References Cited

U.S. PATENT DOCUMENTS

2018/0019855 A1* 1/2018 Zhang ................ H04L 1/0026
2018/0062724 A1* 3/2018 Onggosanusi ....... H04B 7/0626
2019/0109626 A1* 4/2019 Park .................... H04B 7/0626

OTHER PUBLICATIONS

3GPP TS 36.213 (V10.0.1); Evolved Universal Terrestrial Radio Access (E-UTRA); Physical layer procedures (Release 10) (Sep. 2012); Valbonne France.
(Continued)

Primary Examiner — Kyaw Z Soe
(74) Attorney, Agent, or Firm — Stoel Rives LLP

(57) ABSTRACT

Technology for a user equipment (UE) operable for channel state information (CSI) reporting for selected bandwidth parts is disclosed. The UE can be configured to decode CSI reporting parameters for one or more bandwidth parts (BWPs). The UE can be configured to calculate CSI for the one or more BWPs based on measurements from the one or more BWPs and the CSI reporting parameters for the one or more BWPs. The UE can be configured to generate one or more CSI reports for the one or more BWPs based on measurements from the one or more BWPs and the CSI reporting parameters for the one or more BWPs. The UE can be configured to encode the one or more CSI reports using the one or more BWPs.

23 Claims, 11 Drawing Sheets

Related U.S. Application Data

(60) Provisional application No. 62/570,013, filed on Oct. 9, 2017, provisional application No. 62/565,841, filed on Sep. 29, 2017.

(51) Int. Cl.
*H04B 7/0456* (2017.01)
*H04L 5/00* (2006.01)
*H04W 24/10* (2009.01)

(52) U.S. Cl.
CPC .......... *H04L 5/0057* (2013.01); *H04L 5/0094* (2013.01); *H04W 24/10* (2013.01); *H04W 72/042* (2013.01); *H04W 72/0446* (2013.01)

(56) References Cited

OTHER PUBLICATIONS

3GPP TS 36.213 (V11.0.0); Evolved Universal Terrestrial Radio Access (E-UTRA); Physical layer procedures (Release 11) (Sep. 2012); Valbonne France.

\* cited by examiner

CHANNEL STATE INFORMATION (CSI) REPORTING FOR BANDWIDTH PARTS

RELATED APPLICATIONS

The present application is a continuation of U.S. patent application Ser. No. 16/147,204 filed Sep. 28, 2018 which claims the benefit of U.S. Provisional Patent Application No. 62/565,841 filed Sep. 29, 2017 and U.S. Provisional Patent Application No. 62/570,013 filed Oct. 9, 2017, the entire specifications of which are each hereby incorporated by reference in their entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
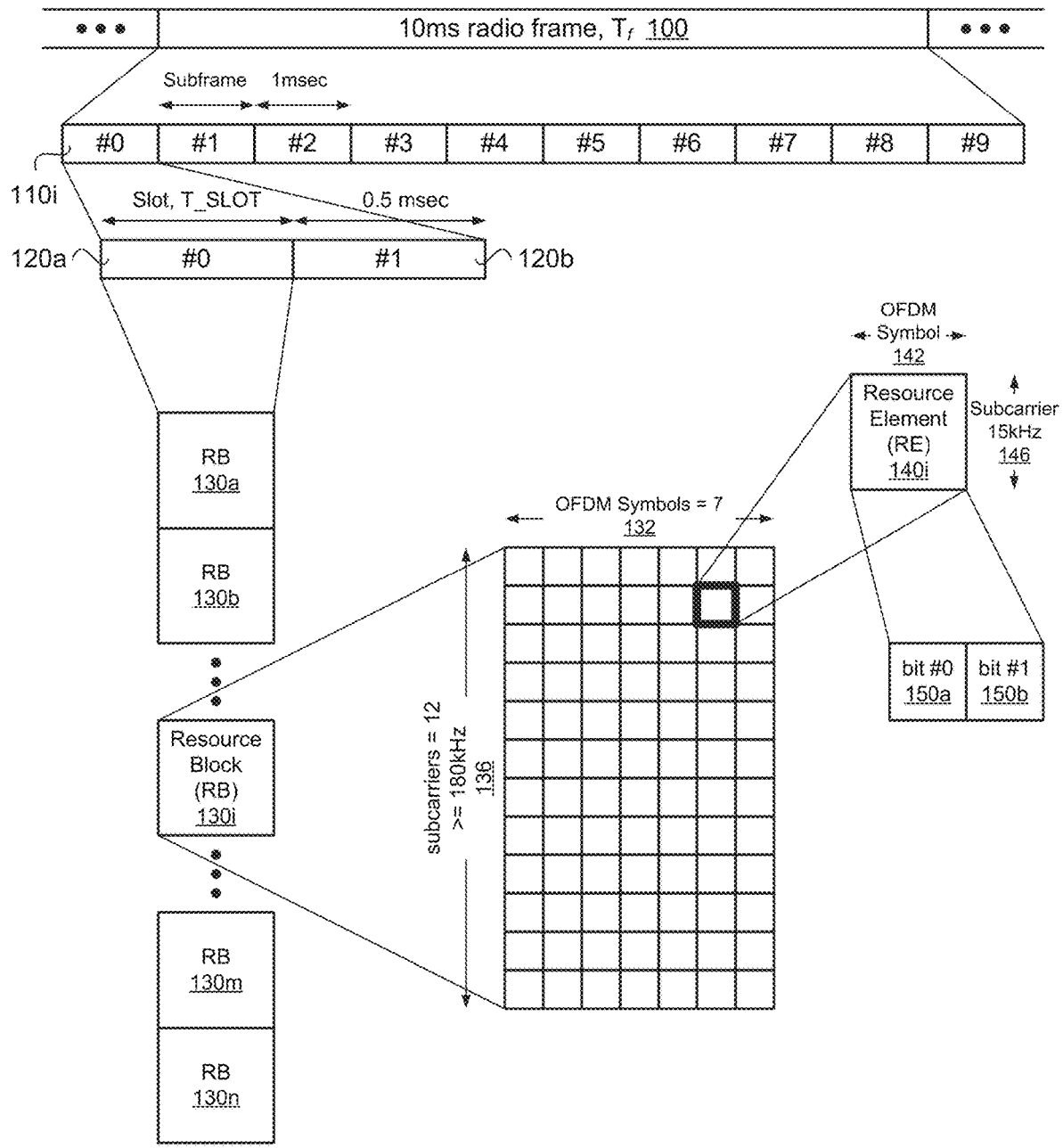
FIG. 1 illustrates a block diagram of an orthogonal frequency division multiple access (OFDMA) frame structure in accordance with an example

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The legacy operation of CSI reporting considers multiple component carriers (CCs) and/or multiple channel state information (CSI) processes without consideration of the multiple bandwidth parts (BWPs) within a given CC. In one example, a UE can be configured to decode CSI reporting parameters for one or more bandwidth parts (BWPs); calculate CSI for the one or more BWPs based on measurements from the one or more BWPs and the CSI reporting parameters for the one or more BWPs; generate one or more CSI reports for the one or more BWPs based on measurements from the one or more BWPs and the CSI reporting parameters for the one or more BWPs; and encode the one or more CSI reports using the one or more BWPs.

The legacy operation of CSI ordering proposes CSI omitting rules that assume a single CSI report. Some proposals aim to skip every Nth sub-band report or drops sub-bands to fit an available CSI container size. However, the legacy operation does not set forth the omitting rules in the case of multiple CSI reports.

In one example, a UE can be configured to decode aperiodic CSI report configuration information to configure the UE to calculate CSI to generate two or more CSI reports; decode downlink control information (DCI) that indicates an available payload size for CSI reporting by the UE; determine a subset of the two or more CSI reports, wherein the subset of the two or more CSI reports has a maximum payload size that is less than the available payload size, wherein the subset is selected according to a predetermined rule; and encode the subset of the two or more CSI reports.

FIG. 1 provides an example of a 3GPP LTE Release 8 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110*i* that are each 1 ms long. Each subframe can be further subdivided into two slots 120*a* and 120*b*, each with a duration, $T_{slot}$, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first Orthogonal Frequency Division Multiplexing (OFDM) symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130i can include 12-15 kilohertz (kHz) subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP LTE Release 8 frame structure provides examples of the way in which data is transmitted, or the transmission mode. The example is not intended to be limiting. Many of the Release 8 features will evolve and change in 5G frame structures included in 3GPP LTE Release 15, MulteFire Release 1.1, and beyond. In such a system, the design constraint can be on coexistence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In another example, New Radio (NR) can be operated with larger system bandwidth, which can be partitioned into multiple bandwidth parts (BWPs) in which each BWP has a specific configurable numerology, i.e. subcarrier spacing and cyclic prefix duration. A user equipment (UE) can be configured with one or more bandwidth parts for downlink (DL) and uplink (UL) for a given time instance. In the case in which one DL BWP is active for a provided time instance, a UE can assume that the physical downlink shared channel (PDSCH) and the corresponding physical downlink control channel (PDCCH) can be transmitted within the same BWP if the PDSCH transmission starts no later than K symbols after the end of the PDCCH transmission, wherein K is an integer greater than 0. In this particular case, the PDCCH corresponding to the PDSCH is the PDCCH that carries scheduling assignment for the PDSCH.

In another example, for the indication of active DL or UL BWPs to a UE, the following options are considered (including all combinations thereof): (a) downlink control information (DCI), which can be explicit or implicit, (b) medium access control (MAC) control element (CE), and (c) time pattern, e.g., discontinuous reception (DRX).

In another example, in 3GPP 5G NR Release 15, there can be at most one active DL BWP and at most one active UL BWP at a provided time instance for a serving cell. NR supports the use case in which a single scheduling DCI can switch the active BWP of a UE from one BWP to another BWP of the same link direction within a given serving cell.

In another example, Long Term Evolution (LTE) Advanced (LTE-A) supports two types of channel state information (CSI) reporting—periodic and aperiodic. Periodic CSI reporting can be mainly used to indicate the channel quality of the downlink channel at the UE on a long-term basis. Periodic CSI is provided by the UE in accordance to a predefined reporting time schedule configured by the serving cell using higher layer signaling (such as radio resource control (RRC) signaling) and can usually have low overhead. In contrast, aperiodic CSI reporting can be used to provide larger and more detailed reporting in a single reporting instance based on the dynamic CSI request triggered by the serving cell using the CSI request in DCI.

In another example, in carrier aggregation, multiple CSIs corresponding to multiple DL cells can be requested by the eNB in accordance to the Table 7.2.1-1A defined in Technical Specification (TS) 36.213 Release 10. The set of serving cells for CSI reporting corresponding to CSI request fields '10' and '11' can be configured using RRC signaling.

TABLE 7.2.1-1A

CSI Request field for PDCCH/EPDCCH with uplink DCI format in UE specific search space

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In another example, in transmission mode '10', multiple CSI corresponding to multiple CSI processes on the same serving frequency can be requested by the eNB in accordance to the Table 7.2.1-1B defined in TS 36.213 Release 11.

The set of CSI processes for reporting corresponding to CSI request fields '01', '10', and '11' can be configured using RRC signaling.

TABLE 7.2.1-1B

CSI Request field for PDCCH/EPDCCH with uplink DCI format in UE specific search space

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

In another example, the aperiodic CSI triggering can be performed by setting the DCI formats '0' or '4' so that the modulation and coding scheme (MCS) and resource allocation size is configured so that the MCS index ($I_{MCS}$)=29 and the number of physical resource blocks ($N_{PRB}$)≤x(e.g., x=4 or x=20).

In another example, in the case of aperiodic CSI feedback, the UE can send the CSI request in every subframe. This can give the network full flexibility to assign the resources to the UE for CSI transmission, however there can be additional overhead associated with the transmission of the triggering DCIs on PDCCH or enhance PDCCH (ePDCCH) in every subframe. In a full dimension multiple input multiple output (FD-MIMO) system with many UEs, the overhead can be significant and some methods to reduce the control channel loading can be considered.

In another example, aperiodic CSI reporting can be provided by the UE per bandwidth part. In another example, DCI, triggering aperiodic CSI reporting for the UE, can contain information indicating the particular BWP that should be used by the UE for CSI calculation and reporting.

In another example, the CSI reporting can be performed for the BWP in which the corresponding DCI triggering aperiodic CSI was received by the UE.

In another example, the DCI can contain one or more explicit bits indicating the BWP for which CSI reporting is provided by the UE. The one or more explicit bits that indicate the BWP can be one or more dedicated bits or one or more bits used for indication of aperiodic CSI reporting.

In another example, periodic reporting can be provided by the UE per bandwidth part. In another example, the UE can be configured with multiple periodic CSI reporting settings (such as codebook type, sub-band or wideband reporting, or reporting time instances) that can correspond to different BWPs.

In another example, the UE, which can be based on the currently active BWP as determined by DCI, can perform periodic CSI reporting according to the CSI reporting configuration corresponding to the currently active BWP.

In another example, CSI reporting can be provided by the UE for all configured BWPs. In this example, the reporting time instances for different BWPs can be different.

In another example, semi-persistent CSI reporting can be provided by the UE per bandwidth part. In another example, DCI, activating semi-persistent CSI reporting for the UE, can contain information indicating the BWP that should be used by the UE for CSI calculation and reporting.

In another example, the CSI reporting can be performed for the BWP in which the corresponding DCI activating semi-persistent CSI was received by the UE.

In another example, DCI can contain one or more explicit bits on the BWP for which semi-persistent CSI reporting can be provided by the UE. The one or more explicit bits indicating the BWP can be one or more dedicated bits or one or more bits used for indication of semi-persistent CSI reporting.

In another example, NR can support aperiodic CSI reporting on the PUSCH. Aperiodic CSI reporting can support Type I and Type II codebooks. The codebook can be a product of a w1 matrix and a w2 matrix. The precoding matrix indicator (PMI) for the Type I codebook can be constructed from the Kronecker product of two discrete Fourier transform (DFT) vectors corresponding to the $1^{st}$ and $2^{nd}$ beamforming directions for each polarization. The indication of the selected DFT vector can be supported using the i1 element, wherein the i1 element can select the w1 matrix. The i1 element can be the component of the PMI that can indicate a subset of DFT beams available for further selection by i2, wherein the subset of DFT beams can include a single beam. Precoding for two polarizations of the cross polarized antenna array can be supported using the i2 element, wherein the i2 element can select the w2 matrix, indicating quadrature phase shift keying (QPSK) based co-phasing. The i2 element can be the component of PMI that can indicate co-phasing for antennas with different polarization. The PMI for the Type II codebook can be constructed from the linear combination of up to four DFT based vectors of the Type I codebook.

In another example, aperiodic CSI reporting on the PUSCH can contain two CSI reporting parts—Part I and Part II. Part I can have a fixed payload size and Part II can have a variable payload size. The payload size of Part II can depend on the actual content of Part I. For the Type I codebook, Part I can contain: (a) the CSI reference signal (CSI-RS) resource index (CRI), (b) the rank indicator (RI), and (c) the 1st channel quality indicator (CQI).

In another example, when the Tx/Rx Point (TRP) requests CSI feedback, the actual payload size may be unknown. Therefore, sufficient resources should be allocated for the CSI reporting to accommodate the maximum possible payload size of the CSI report. For some scenarios, the TRP can allocate fewer resources.

In another example, in the CSI reporting framework for NR, a UE can be configured with: (a) one or more CSI measurement settings, (b) one or more CSI reporting settings, wherein the number of CSI reporting settings can be represented by an integer N that is greater than or equal to 1, and (c) one or more CSI resource settings, wherein the number of CSI resource settings can be represented by an integer M that is greater than or equal to 1.

In another example, the one or more CSI measurement settings can include one or more links, wherein the number of links can be represented by an integer L that is greater than or equal to 1. Each link can correspond to a CSI reporting setting, a CSI resource setting, and a quantity to be measured.

In another example, the one or more CSI reporting settings can include one or more links to CSI resource settings, wherein the number of links can be represented by an integer L that is greater than or equal to 1. Each link or set of the links can correspond to a CSI reporting setting, a CSI Resource Setting, and a quantity to be measured.

In another example, the term "CSI reporting settings" can be used interchangeably with the term "CSI measurement settings."

In another example, the one or more CSI reporting settings can include: (a) reported CSI parameters, (b) codebook configuration information (such as Type, mode, CSR (codebook subset restriction), and the like), (c) time-domain behavior (i.e., aperiodic CSI reporting, periodic CSI reporting, semi-persistent CSI reporting), (d) frequency granularity for CQI and PMI reports, and (e) measurement restrictions for channel and interference.

In another example, the one or more CSI resource settings can include a configuration of one or more CSI resource sets, wherein the one or more CSI resource sets can be represented by the integer S that is greater than or equal to 1. Each CSI resource set can be selected from a set of all configured CSI-RS resources to the UE.

In another example, the one or more CSI resource settings can also include a configuration of one or more CSI-RS resources, wherein the number of CSI-RS resources can be represented by the integer Ks that is greater than or equal to 1. The configuration of one or more CSI-RS resources can include: (a) mapping to resource elements (REs), (b) the number of ports, (c) time-domain behavior, (d) reference signal (RS) frequency span, (e) RS power, and (f) mapping to orthogonal frequency division multiplexing (OFDM) symbols in a slot.

Figure 2A:
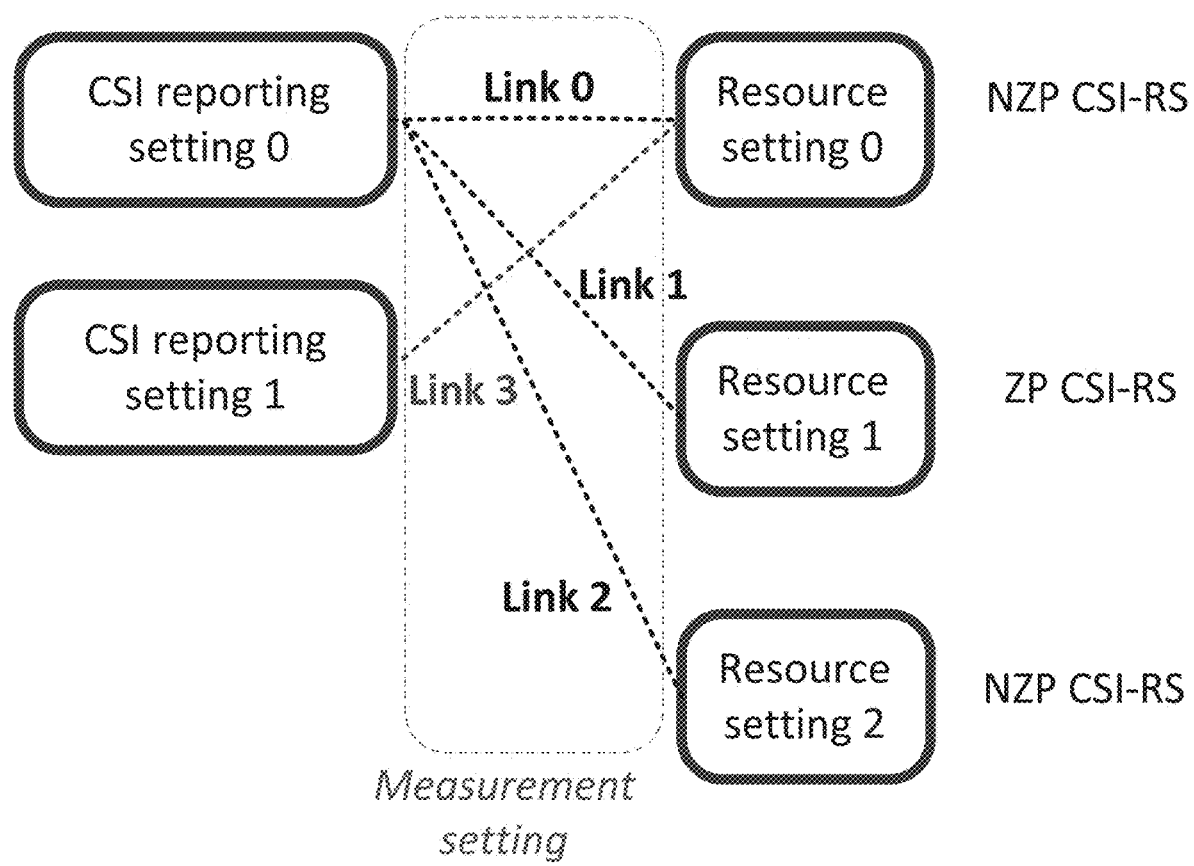
FIG. 2*a* illustrates channel state information (CSI) reporting in accordance with an example.

In another example, FIG. 2a illustrates channel state information (CSI) reporting. In this example, there can be a CSI reporting setting 0 and a CSI reporting setting 1. CSI reporting setting 0 can include a link 0, a link 1, and a link 2. The link 0 can provide a link between CSI reporting setting 0 and resource setting 0. Resource setting 0 can include non-zero-power (NZP) CSI-RS. The link 1 can provide a link between CSI reporting setting 0 and resource setting 1. Resource setting 1 can include zero-power (ZP) CSI-RS. The link 2 can provide a link between CSI reporting setting 0 and resource setting 2. Resource setting 2 can include NZP CSI-RS. CSI reporting setting 1 can include a link 3. The link 3 can provide a link between CSI reporting setting 1 and resource setting 0. Resource setting 0 can include NZP CSI-RS. Each of the links, link 0, link 1, link 2, and link 3, can be classified as measurement settings.

Figure 2B:
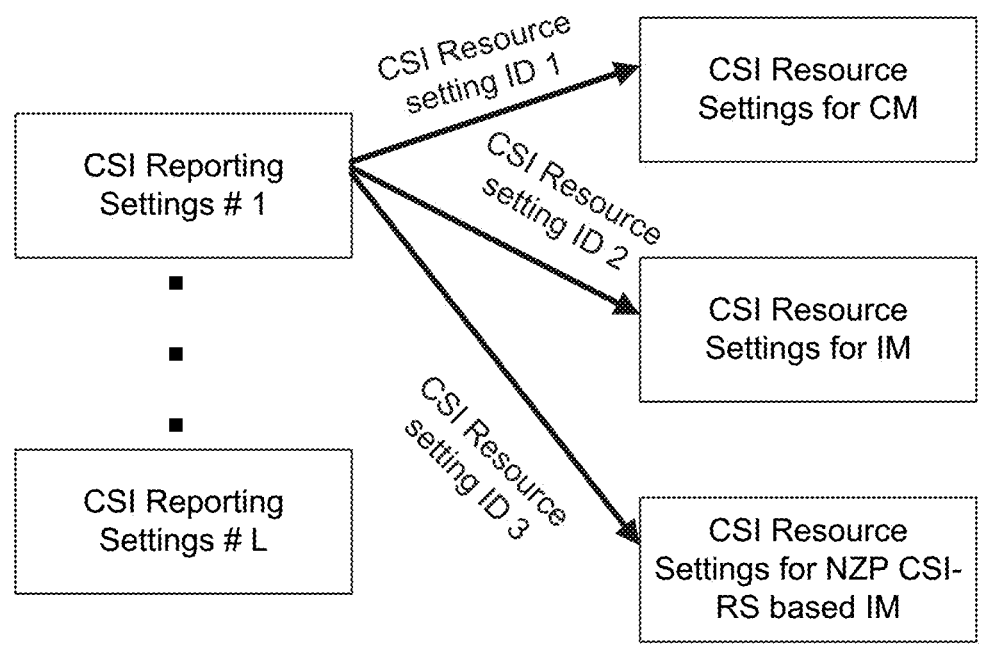
FIG. 2*b* illustrates channel state information (CSI) reporting in accordance with an example.

In another example, FIG. 2b illustrates channel state information (CSI) reporting. In this example, there can be a CSI Reporting Setting #1, a CSI Reporting Setting #2, a CSI Reporting Setting #3, and so forth up until CSI Reporting Setting # L, wherein L is a positive integer. CSI Reporting Setting #1 can include a CSI Resource setting identification (ID) 1, a CSI Resource setting ID 2, and a CSI Resource setting ID 3. CSI Resource setting ID 1 can provide a link between CSI Reporting setting #1 and CSI Resource Setting for channel measurement (CM). CSI Resource setting ID 2 can provide a link between CSI Reporting Setting #1 and CSI Resource Settings for interference measurement (IM). CSI Resource Setting ID 3 can provide a link between CSI Reporting Setting #1 and CSI Resource Settings for NZP CSI-RS based IM.

In another example, the CSI resource setting IDs can be associated with each of the CSI reporting settings. In another example, one CSI resource setting can be used for multiple CSI reporting settings. In another example, the CSI can be dropped based on the ID of a CSI reporting setting, wherein each CSI can be associated with a CSI reporting setting.

In another example, priority rules can be used to select the CSI which can be reported or skipped from transmission. When the total payload size of the aperiodic CSI report exceeds the maximum payload size available for aperiodic CSI reporting and when the UE has two or more Part II CSI reports, the UE may transmit only the CSI corresponding to the component carriers (CCs) with the lowest indices. In another example, when the total payload size of the aperiodic CSI report exceeds the maximum payload size available for aperiodic CSI reporting and when the UE has two or more Part II CSI reports, the UE may transmit only the CSI corresponding to the CSI reporting settings with the lowest indices. The resulting payload size can have a maximum value that is less than or equal to the maximum payload size available for aperiodic CSI reporting.

In another example, when the total payload size of the aperiodic CSI report exceeds the maximum payload size available for aperiodic CSI reporting, and when the UE has two or more Part II CSI reports, and when the Part II CSI reports have the same CC index, the UE may transmit only the CSI corresponding to the CC links with the lowest indices. In another example, when the total payload size of the aperiodic CSI report exceeds the maximum payload size available for aperiodic CSI reporting, and when the UE has two or more Part II CSI reports, and when the Part II CSI reports have the same CC index, the UE may transmit only the CSI corresponding to the CSI reporting settings with the lowest indices. The resulting payload size can have a maximum value that is less than or equal to the maximum payload size available for aperiodic CSI reporting.

These priority rules can include ordering the CSI reports in a predetermined manner with the selection of a desired number of CSI reports.

In another example, the priorities for different CC and link indexing can be different. In particular, when the total payload size of the aperiodic CSI report exceeds the maximum payload size available for aperiodic CSI reporting, and when the UE has two or more Part II CSI reports, the UE may transmit only the CSI corresponding to the CCs with the highest indices. In particular, when the total payload size of the aperiodic CSI report exceeds the maximum payload size available for aperiodic CSI reporting, and when the UE has two or more Part II CSI reports, the UE may transmit only the CSI corresponding to the CSI reporting settings with the highest indices. The resulting payload size can have a maximum value that is less than or equal to the maximum payload size available for aperiodic CSI reporting.

In another example, when the total payload size of the aperiodic CSI report exceeds the maximum payload size available for aperiodic CSI reporting, and when the UE has two or more Part II CSI reports, and when the Part II CSI reports have the same CC index, the UE may transmit only the CSI corresponding to the CC links with the highest indices. In another example, when the total payload size of the aperiodic CSI report exceeds the maximum payload size available for aperiodic CSI reporting, and when the UE has two or more Part II CSI reports, and when the Part II CSI reports have the same CC index, the UE may transmit only the CSI corresponding to the CSI reporting settings with the highest indices. The resulting payload size can have a maximum value that is less than or equal to the maximum payload size available for aperiodic CSI reporting.

In another example, when the total payload size of the aperiodic CSI report exceeds the maximum payload size available for aperiodic CSI reporting, and when the UE has two or more Part II CSI reports, and when the CSI link index is global across CCs, the UE may use only the CSI link index to determine the priority ordering of CSI reports. The CSI link index can refer to one link or a set of links, as illustrated in FIG. 2a. In another example, when the total payload size of the aperiodic CSI report exceeds the maximum payload size available for aperiodic CSI reporting, and when the UE has two or more Part II CSI reports, and when the CSI reporting settings are global across CCs, the UE may use only the CSI reporting setting to determine the priority ordering of CSI reports. The resulting payload size can have a maximum value that is less than or equal to the maximum payload size available for aperiodic CSI reporting.

In another example, when the total payload size of the aperiodic CSI report exceeds the maximum payload size available for aperiodic CSI reporting, and when the UE has two or more Part II CSI reports, and when the Part II CSI reports have the same CC index, and when the CSI link index is global across CCs, the UE may use only the CSI link index to determine the priority ordering of CSI reports. In another example, when the total payload size of the aperiodic CSI report exceeds the maximum payload size available for aperiodic CSI reporting, and when the UE has two or more Part II CSI reports, and when the Part II CSI reports have the same CSI reporting setting index, and when the CSI reporting setting index is global across CCs, the UE may use only the CSI reporting setting index to determine the priority ordering of CSI reports. The resulting payload size can have a maximum value that is less than or equal to the maximum payload size available for aperiodic CSI reporting.

Figure 3:
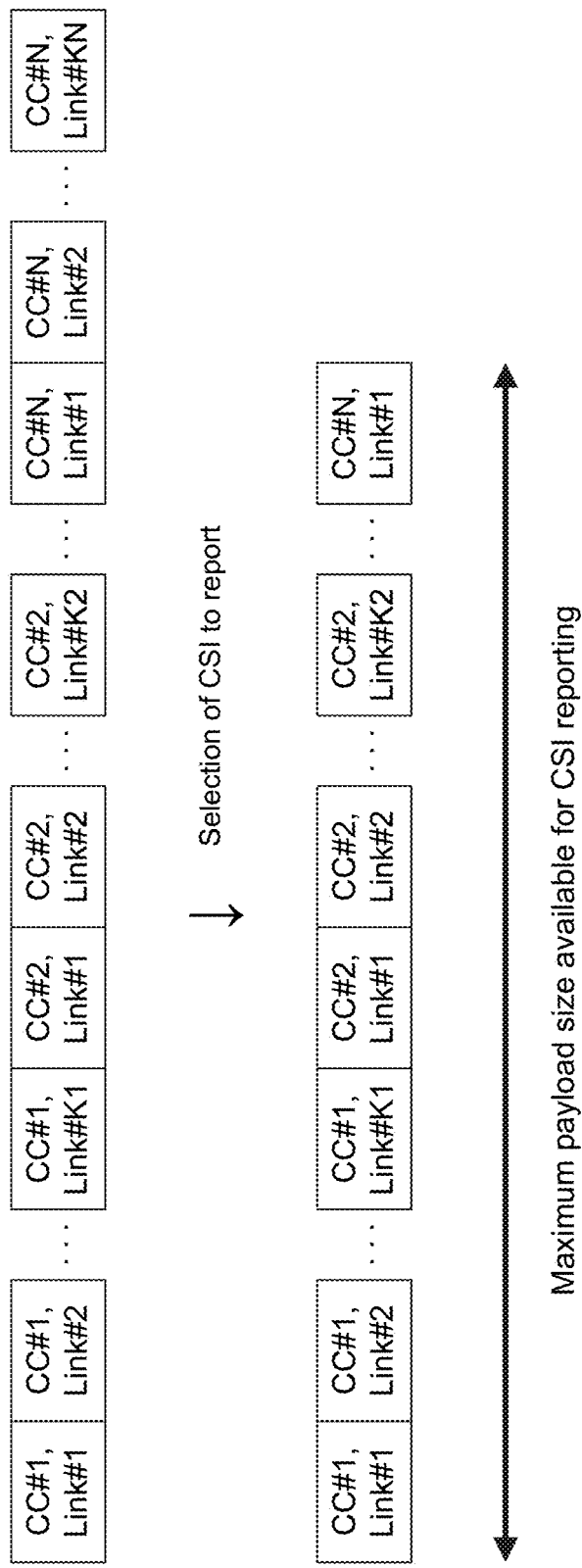
FIG. 3 illustrates channel state information (CSI) ordering in accordance with an example.

In another example, FIG. 3 illustrates channel state information (CSI) ordering. A CC index can range between 1 and N, where N is a positive integer. A link index can range between: 1 and K for a CC index of 1, 1 and K2 for a CC index of 2, 1 and KN for a CC index of N, and so forth. The selection of a CSI to report can be ordered in various ways according to the priority rules provided above. In this example, the UE may transmit only the CSI corresponding to the CCs with the lowest indices and the CSI corresponding to the CC links with the lowest indices.

In another example, a CC index can range between 1 and N, where N is a positive integer. A CSI reporting setting index can range between: 1 and K for a CC index of 1, 1 and K2 for a CC index of 2, 1 and KN for a CC index of N, and so forth. The selection of a CSI to report can be ordered in various ways according to the priority rules provided above. In this example, the UE may transmit only the CSI corresponding to the CCs with the lowest indices and the CSI corresponding to the CSI reporting settings with the lowest indices.

In one example, the UE may transmit only the CSI corresponding to the CCs with the lowest indices. In another example, the UE may transmit only the CSI corresponding to the CC links with the lowest indices. In another example, the UE may transmit only the CSI corresponding to the CCs with the highest indices. In another example, the UE may transmit only the CSI corresponding to the CC links with the highest indices. In another example, the UE may use only the CSI link index to determine the priority ordering of CSI reports.

In another example, the UE may transmit only the CSI corresponding to the CSI reporting settings with the lowest indices. In another example, the UE may transmit only the CSI corresponding to the CSI reporting settings with the highest indices. In another example, the UE may use only the CSI reporting setting index to determine the priority ordering of CSI reports.

Figure 4:
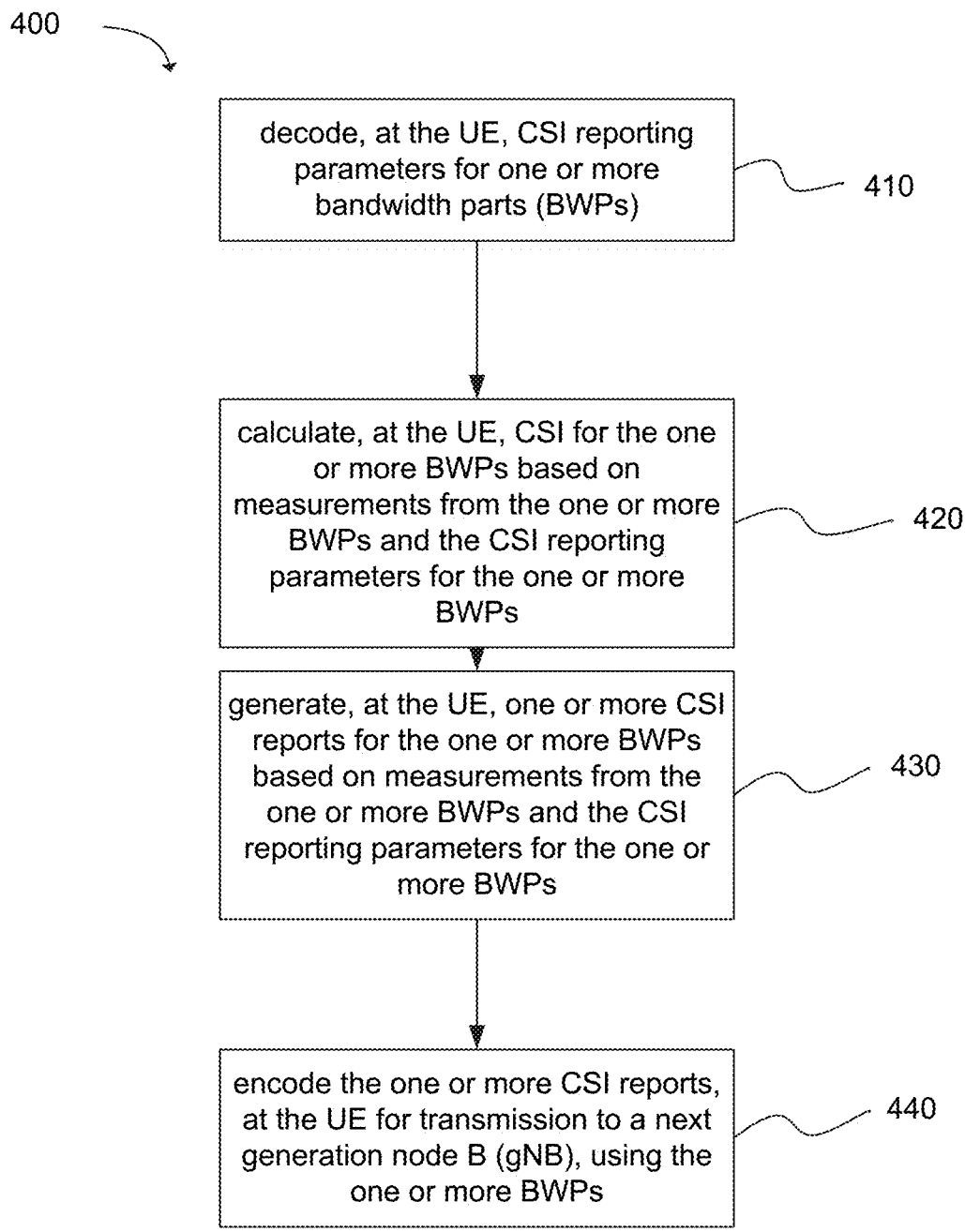
FIG. 4 depicts functionality of a user equipment (UE) operable for channel state information (CSI) reporting in accordance with an example.

Another example provides functionality 400 of a UE operable for channel state information (CSI) reporting for selected bandwidth parts, as shown in FIG. 4. The UE can comprise one or more processors. The one or more processors can be configured to decode, at the UE, CSI reporting parameters for one or more bandwidth parts (BWPs), as in block 410. The one or more processors can be configured to calculate, at the UE, CSI for the one or more BWPs based on measurements from the one or more BWPs and the CSI reporting parameters for the one or more BWPs, as in block 420. The one or more processors can be configured to generate, at the UE, one or more CSI reports for the one or more BWPs based on measurements from the one or more BWPs and the CSI reporting parameters for the one or more BWPs, as in block 430. The one or more processors can be configured to encode the one or more CSI reports, at the UE for transmission to a next generation node B (gNB), using the one or more BWPs, as in block 440. In addition, the UE can comprise a memory interface configured to send to a memory the one or more CSI reports.

Figure 5:
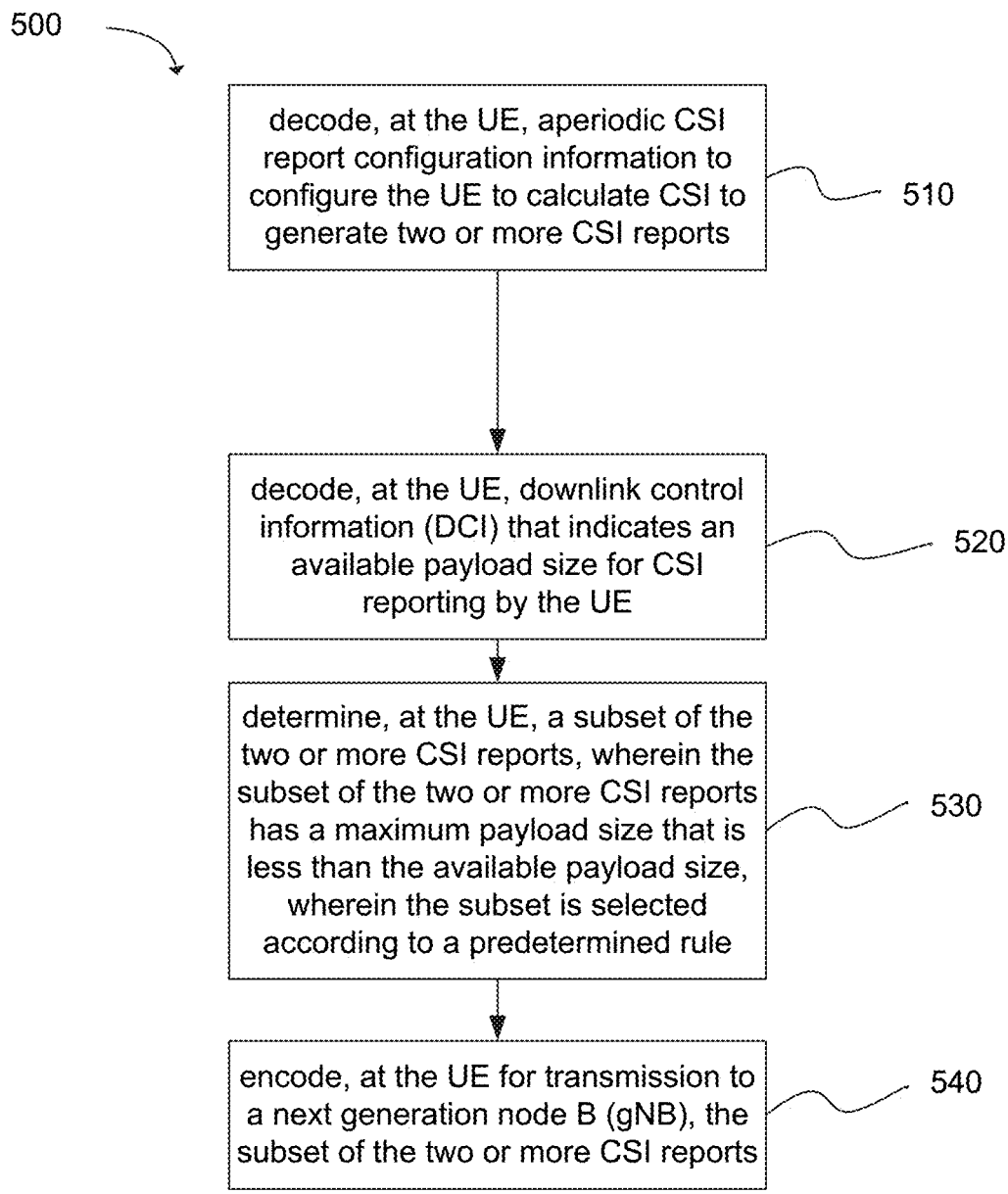
FIG. 5 depicts functionality of a user equipment (UE) operable for channel state information (CSI) report selection in accordance with an example.

Another example provides functionality 500 of a user equipment (UE) operable for channel state information (CSI) report selection, as shown in FIG. 5. The UE can comprise one or more processors. The one or more processors can be configured to decode, at the UE, aperiodic CSI report configuration information to configure the UE to calculate CSI to generate two or more CSI reports, as in block 510. The one or more processors can be configured to decode, at the UE, downlink control information (DCI) that indicates an available payload size for CSI reporting by the UE, as in block 520. The one or more processors can be configured to determine, at the UE, a subset of the two or more CSI reports, wherein the subset of the two or more CSI reports has a maximum payload size that is less than the available payload size, wherein the subset is selected according to a predetermined rule, as in block 530. The one or more processors can be configured to encode, at the UE for transmission to a next generation node B (gNB), the subset of the two or more CSI reports, as in block 540. In addition, the UE can comprise a memory interface configured to send to a memory the subset of the two or more CSI reports.

Figure 6:
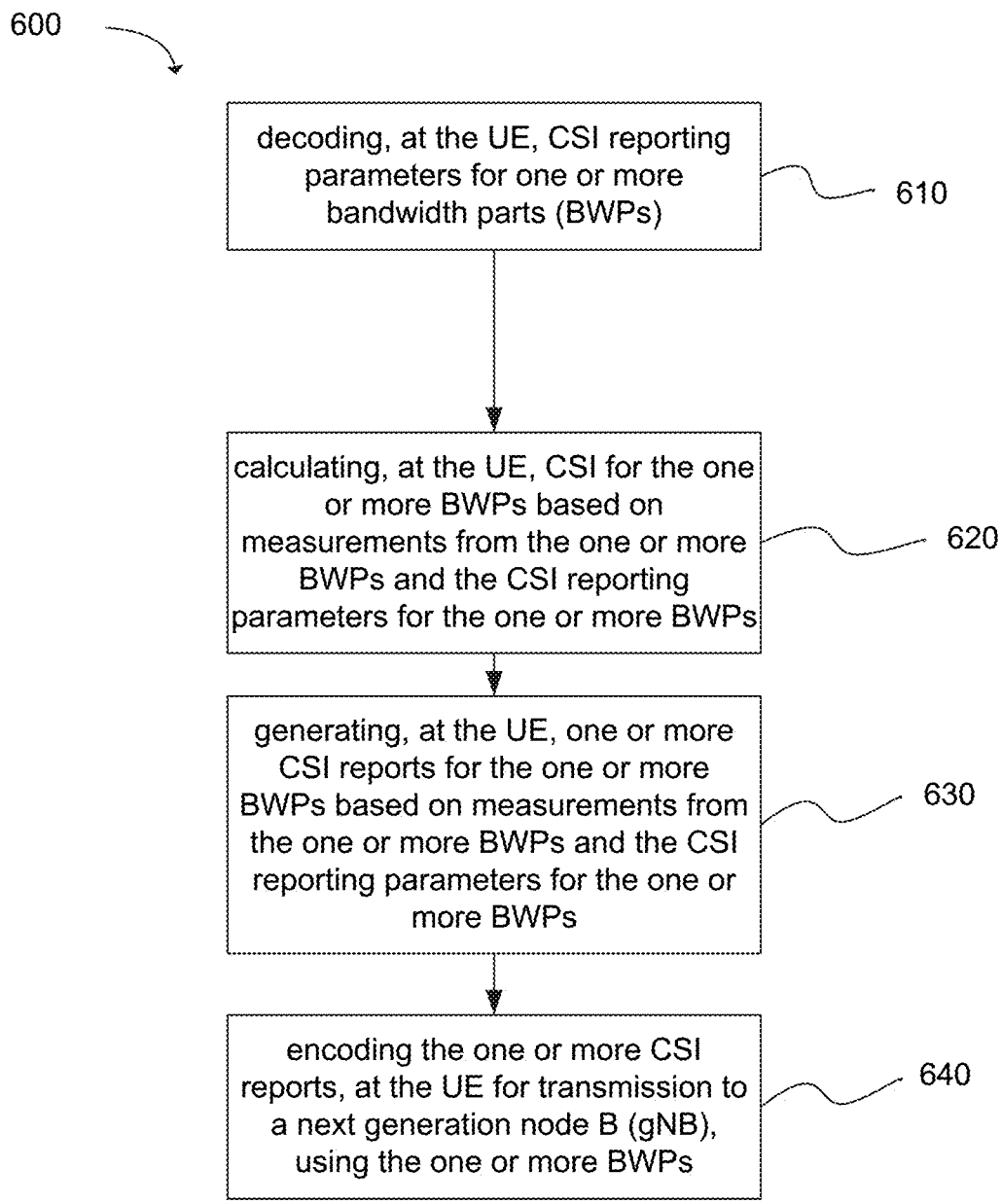
FIG. 6 depicts a flowchart of a machine readable storage medium having instructions embodied thereon for channel state information (CSI) reporting in accordance with an example.

Another example provides at least one machine readable storage medium having instructions 600 embodied thereon for channel state information (CSI) reporting for selected bandwidth parts, as shown in FIG. 6. The instructions can be executed on a machine, where the instructions are included on at least one computer readable medium or one non-transitory machine readable storage medium. The instructions when executed perform: decoding, at the UE, CSI reporting parameters for one or more bandwidth parts (BWPs), as in block 610. The instructions when executed perform: calculating, at the UE, CSI for the one or more BWPs based on measurements from the one or more BWPs and the CSI reporting parameters for the one or more BWPs, as in block 620. The instructions when executed perform: generating, at the UE, one or more CSI reports for the one or more BWPs based on measurements from the one or more BWPs and the CSI reporting parameters for the one or more BWPs, as in block 630. The instructions when executed perform: encoding the one or more CSI reports, at the UE for transmission to a next generation node B (gNB), using the one or more BWPs, as in block 640.

While examples have been provided in which a gNB has been specified, they are not intended to be limiting. An evolved node B (eNodeB) can be used in place of the gNB. Accordingly, unless otherwise stated, any example herein in which an gNB has been disclosed, can similarly be disclosed with the use of an eNodeB.

Figure 7:
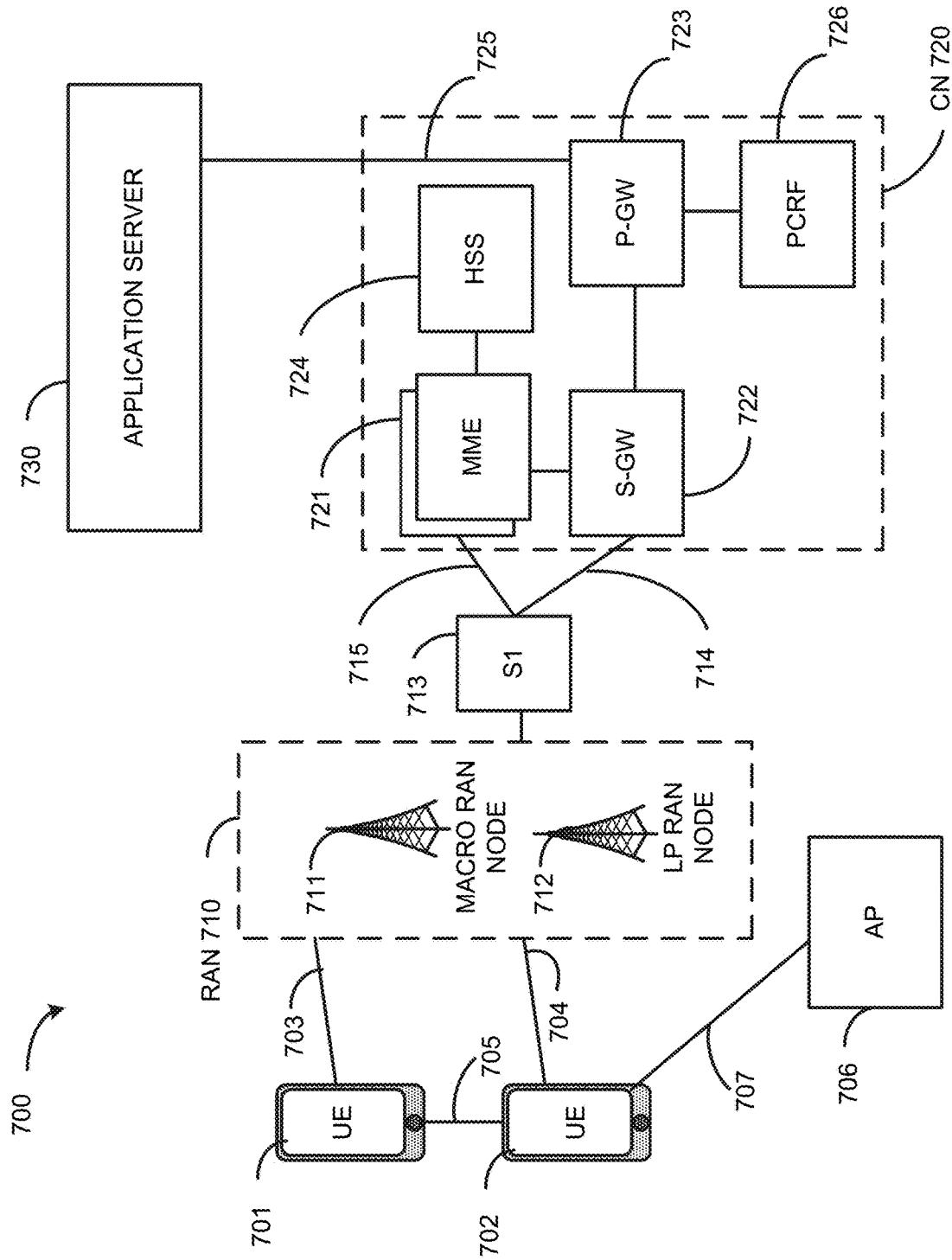
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
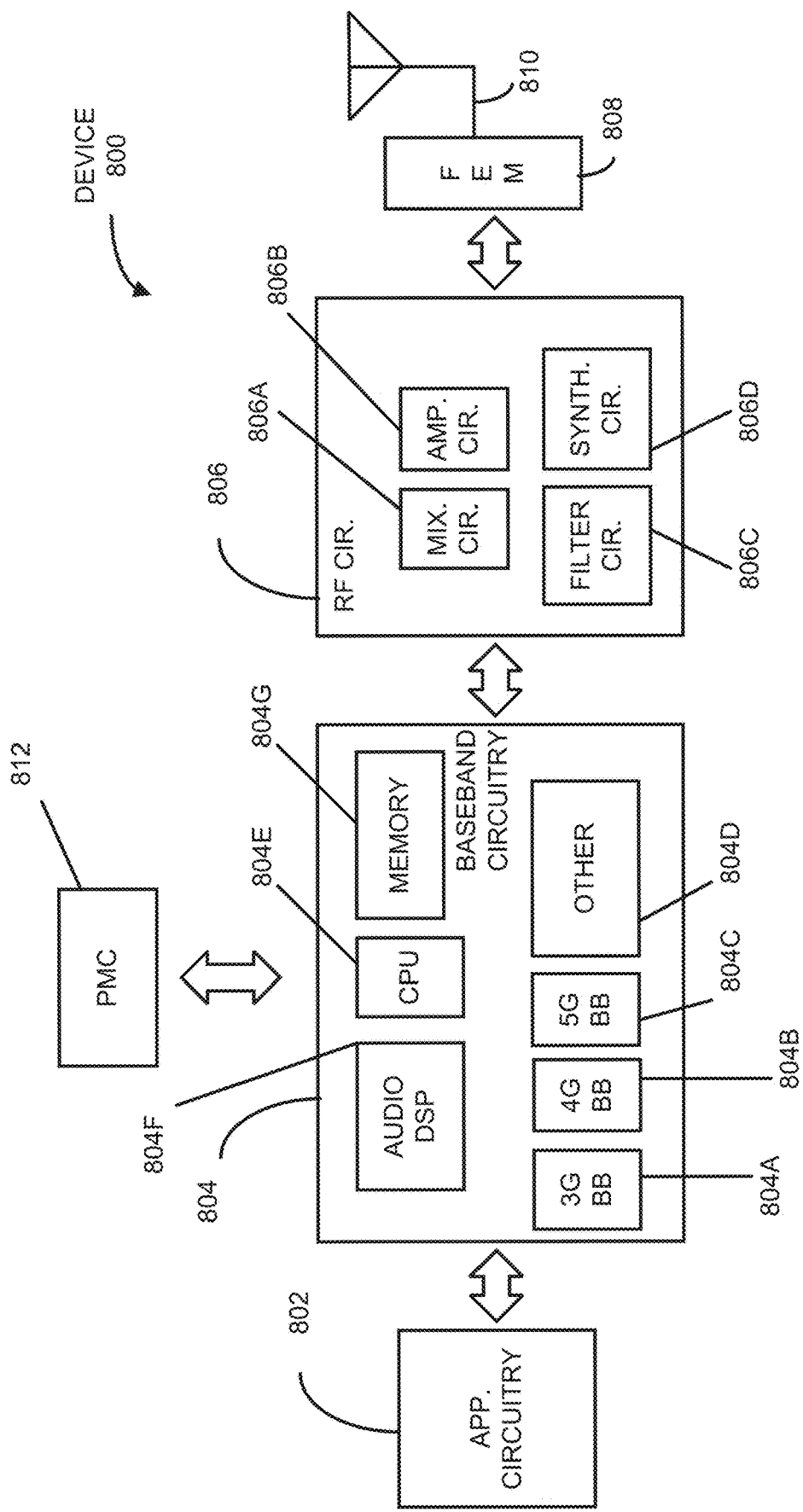
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a third generation (3G) baseband processor 804*a*, a fourth generation (4G) baseband processor 804*b*, a fifth generation (5G) baseband processor 804*c*, or other baseband processor(s) 804*d* for other existing generations, generations in development or to be developed in the future (e.g., second generation (2G), sixth generation (6G), etc.). The baseband circuitry 804 (e.g., one or more of baseband processors 804*a*-*d*) may handle various radio control functions that enable communication with one or more radio networks via the RF circuitry 806. In other embodiments, some or all of the functionality of baseband processors 804*a*-*d* may be included in modules stored in the memory 804*g* and executed via a Central Processing Unit (CPU) 804*e*. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804*f*. The audio DSP(s) 804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806*a*, amplifier circuitry 806*b* and filter circuitry 806*c*. In some embodiments, the transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*.

In some embodiments, the mixer circuitry 806*a* of the receive signal path and the mixer circuitry 806*a* of the transmit signal path may include two or more mixers and may be arranged for quadrature downconversion and upconversion, respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* may be arranged for direct downconversion and direct upconversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
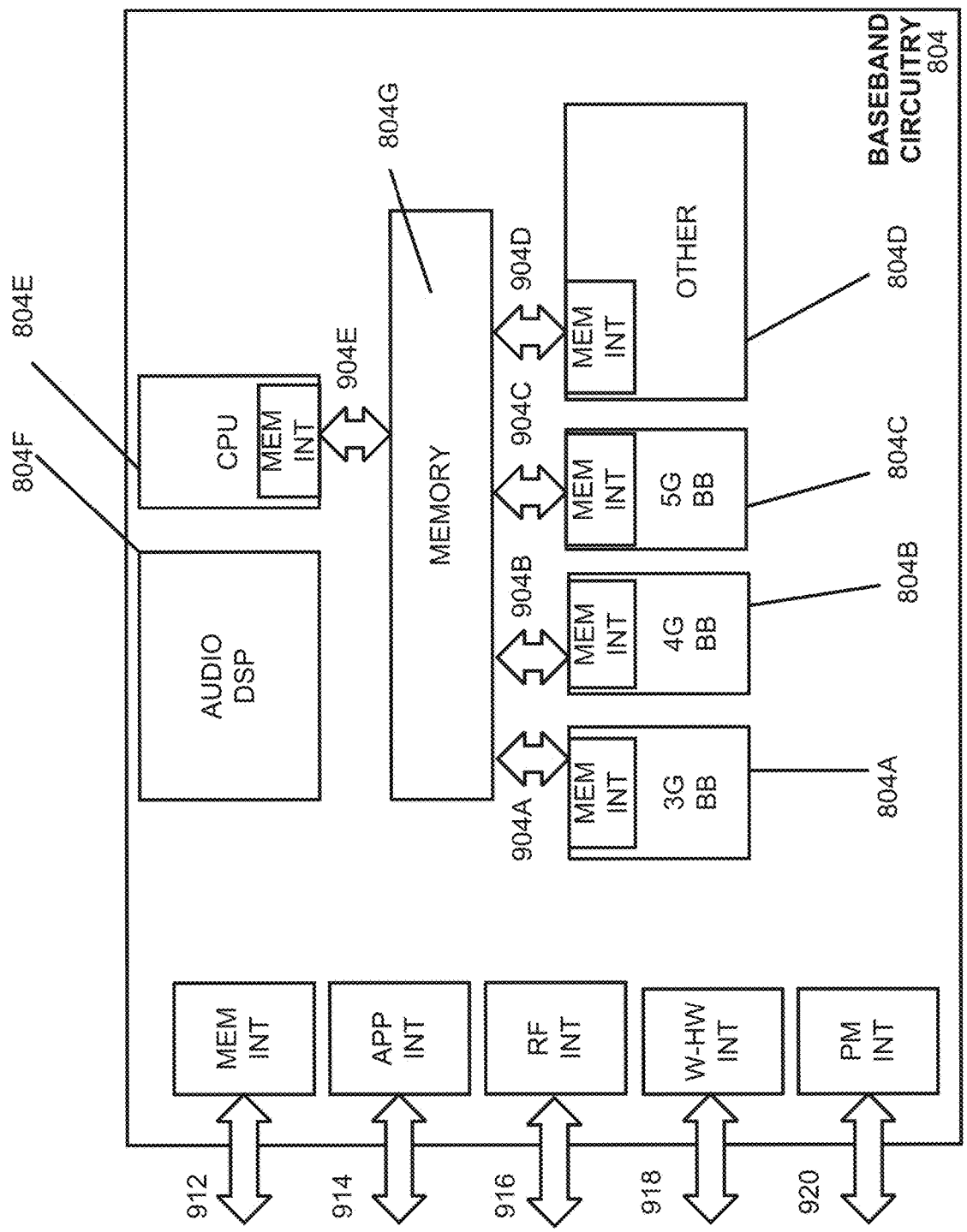
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804a-804e and a memory 804g utilized by said processors. Each of the processors 804a-804e may include a memory interface, 904a-904e, respectively, to send/receive data to/from the memory 804g.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
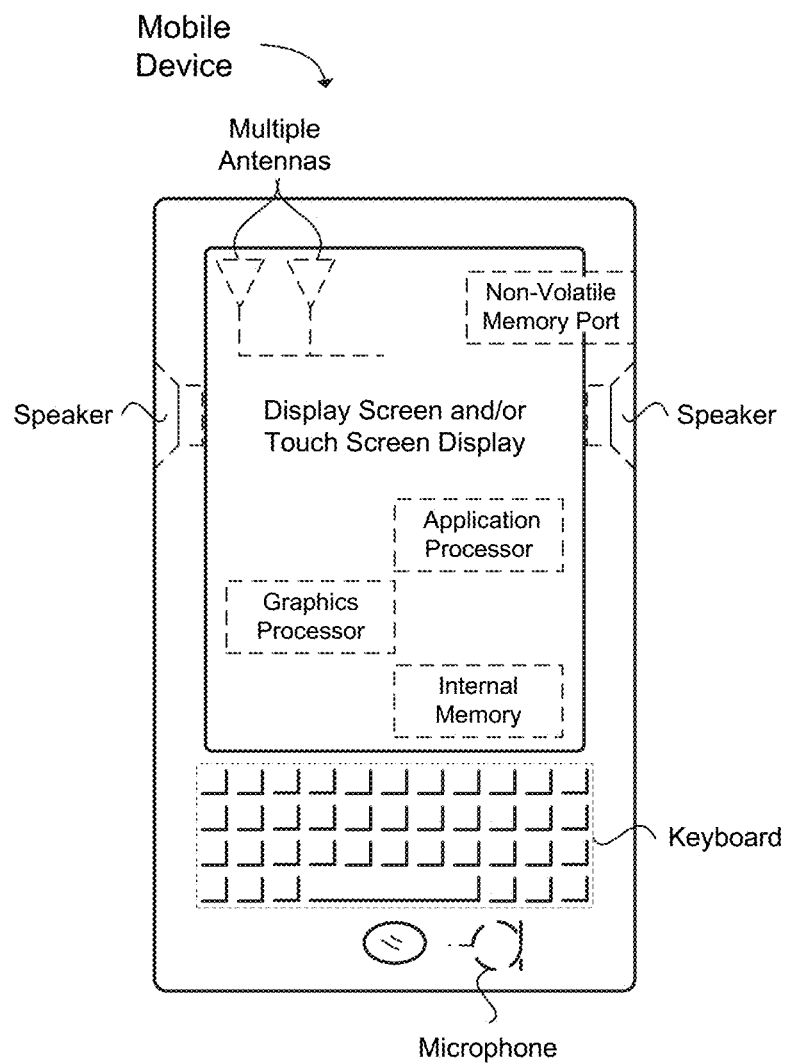
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable for channel state information (CSI) reporting for selected bandwidth parts, the apparatus comprising: one or more processors configured to: decode, at the UE, CSI reporting parameters for one or more bandwidth parts (BWPs); calculate, at the UE, CSI for the one or more BWPs based on measurements from the one or more BWPs and the CSI reporting parameters for the one or more BWPs; generate, at the UE, one or more CSI reports for the one or more BWPs based on measurements from the one or more BWPs and the CSI reporting parameters for the one or more BWPs; and encode the one or more CSI reports, at the UE for transmission to a next generation node B (gNB), using the one or more BWPs; and a memory interface configured to send to a memory the one or more CSI reports.

Example 2 includes the apparatus of Example 1, wherein the one or more processors are further configured to: decode, at the UE, downlink control information (DCI) that includes a trigger for aperiodic CSI reporting for the one or more BWPs.

Example 3 includes the apparatus of Example 2, wherein the one or more processors are further configured to: decode, at the UE, the DCI, wherein the DCI includes one or more explicit bits indicating the one or more BWPs for which CSI reporting is to be provided by the UE; or decode, at the UE, the DCI, wherein the DCI indicates that a BWP of the one or more BWPs that carries the DCI is configured to calculate and report an aperiodic CSI.

Example 4 includes the apparatus of Example 1, wherein the one or more processors are further configured to: decode, at the UE, DCI that indicates a currently active BWP of the one or more BWPs, wherein the currently active BWP is configured to provide periodic CSI reporting.

Example 5 includes the apparatus of Example 1, wherein the one or more processors are further configured to: decode, at the UE, a radio resource control (RRC) signal that includes information indicating which of the one or more BWPs are to calculate and report a periodic CSI.

Example 6 includes the apparatus of Example 1, wherein the one or more processors are further configured to: decode, at the UE, downlink control information (DCI) that includes a trigger for semi-persistent CSI reporting for the one or more BWPs.

Example 7 includes the apparatus of Example 6, wherein the one or more processors are further configured to: decode, at the UE, the DCI, wherein the DCI includes one or more explicit bits indicating the one or more BWPs for which CSI reporting is to be provided by the UE; or decode, at the UE, the DCI, wherein the DCI indicates that a BWP of the one or more BWPs that carries the DCI is configured to calculate and report a semi-persistent CSI.

Example 8 includes an apparatus of a user equipment (UE) operable for channel state information (CSI) report selection, the apparatus comprising: one or more processors configured to: decode, at the UE, aperiodic CSI report configuration information to configure the UE to calculate CSI to generate two or more CSI reports; decode, at the UE, downlink control information (DCI) that indicates an available payload size for CSI reporting by the UE; determine, at the UE, a subset of the two or more CSI reports, wherein the subset of the two or more CSI reports has a maximum payload size that is less than the available payload size, wherein the subset is selected according to a predetermined rule; and encode, at the UE for transmission to a next generation node B (gNB), the subset of the two or more CSI reports; and a memory interface configured to send to a memory the subset of the two or more CSI reports.

Example 9 includes the apparatus of Example 8, wherein the one or more processors are further configured to: select, at the UE, the subset of the two or more CSI reports according to the predetermined rule, wherein the predetermined rule is based on a component carrier (CC) index.

Example 10 includes the apparatus of Example 8, wherein the one or more processors are further configured to: select, at the UE, the subset of the two or more CSI reports according to the predetermined rule, wherein the predetermined rule is based on an index of a CSI reporting setting.

Example 11 includes the apparatus of Example 10, wherein the one or more processors are further configured to: decode, at the UE, aperiodic CSI report configuration information to configure the UE to: determine, at the UE, one or more CSI reporting settings; and determine, at the UE, one or more CSI resource settings.

Example 12 includes the apparatus of Example 11, wherein the one or more processors are further configured to determine the one or more CSI reporting settings, wherein each of the one or more CSI reporting settings includes one or more of: reported CSI parameters; codebook configuration information; time-domain behavior of a CSI report; frequency granularity for channel quality indicator (CQI); precoding matrix indicator (PMI); and measurement restrictions.

Example 13 includes the apparatus of Example 11, wherein the one or more processors are further configured to determine the one or more CSI resource settings, wherein each of the one or more CSI resource settings includes one or more of: a configuration of one or more channel state information reference signal (CSI-RS) resource sets, wherein each CSI-RS resource set is selected from a set of configured CSI-RS resources.

Example 14 includes the apparatus of Example 9, wherein the one or more processors are further configured to: determine the subset of the two or more CSI reports, wherein the subset of the two or more CSI reports has the maximum payload size that is less than the available payload size, wherein the subset is selected according to the predetermined rule, and the predetermined rule is based on: a lowest CC index; or a highest CC index.

Example 15 includes the apparatus of Example 10, wherein the one or more processors are further configured to: determine the subset of the two or more CSI reports, wherein the subset of the two or more CSI reports has the maximum payload size that is less than the available payload size, wherein the subset is selected according to the predetermined rule, and the predetermined rule is based on: a lowest CSI reporting setting index; or a highest CSI reporting setting index.

Example 16 includes the apparatus of Example 14, wherein the one or more processors are further configured to: determine the subset of the two or more CSI reports, wherein the subset of the two or more CSI reports has the maximum payload size that is less than the available payload size, wherein the subset is selected according to the predetermined rule, and the predetermined rule is based on: a lowest CC index followed by a lowest CSI reporting setting index when the CC index is the same; a lowest CC index followed by a highest CSI reporting setting index when the CC index is the same; a highest CC index followed by a lowest CSI reporting setting index when the CC index is the same; or a highest CC index followed by a highest CSI reporting setting index when the CC index is the same.

Example 17 includes the apparatus of Example 15, wherein the one or more processors are further configured to: determine the subset of the two or more CSI reports, wherein the subset of the two or more CSI reports has the maximum payload size that is less than the available payload size, wherein the subset is selected according to the predetermined rule, and the predetermined rule is based on: a lowest CC index followed by a lowest CSI reporting setting index when the CC index is the same; a lowest CC index followed by a highest CSI reporting setting index when the CC index is the same; a highest CC index followed by a lowest CSI reporting setting index when the CC index is the same; or a highest CC index followed by a highest CSI reporting setting index when the CC index is the same.

Example 18 includes at least one non-transitory machine readable storage medium having instructions embodied thereon for channel state information (CSI) reporting for selected bandwidth parts, the instructions when executed by one or more processors at a user equipment (UE) perform the following: decoding, at the UE, CSI reporting parameters for one or more bandwidth parts (BWPs); calculating, at the UE, CSI for the one or more BWPs based on measurements from the one or more BWPs and the CSI reporting parameters for the one or more BWPs; generating, at the UE, one or more CSI reports for the one or more BWPs based on measurements from the one or more BWPs and the CSI reporting parameters for the one or more BWPs; and encoding the one or more CSI reports, at the UE for transmission to a next generation node B (gNB), using the one or more BWPs.

Example 19 includes the at least one non-transitory machine readable storage medium of Example 18, further comprising instructions that when executed perform: decoding, at the UE, downlink control information (DCI) that includes a trigger for aperiodic CSI reporting for the one or more BWPs.

Example 20 includes the at least one non-transitory machine readable storage medium of Example 19, further comprising instructions that when executed perform: decoding, at the UE, the DCI, wherein the DCI includes one or more explicit bits indicating the one or more BWPs for which CSI reporting is to be provided by the UE; or decoding, at the UE, the DCI, wherein the DCI indicates that a BWP of the one or more BWPs that carries the DCI is configured to calculate and report an aperiodic CSI.

Example 21 includes the at least one non-transitory machine readable storage medium of Example 18, further comprising instructions that when executed perform: decoding, at the UE, DCI that indicates a currently active BWP of the one or more BWPs, wherein the currently active BWP is configured to provide periodic CSI reporting.

Example 22 includes the at least one non-transitory machine readable storage medium of Example 18, further comprising instructions that when executed perform: decoding, at the UE, a radio resource control (RRC) signal that includes information indicating which of the one or more BWPs are to calculate and report a periodic CSI.

Example 23 includes the at least one non-transitory machine readable storage medium of Example 18, further comprising instructions that when executed perform: decoding, at the UE, downlink control information (DCI) that includes a trigger for semi-persistent CSI reporting for the one or more BWPs.

Example 24 includes the at least one non-transitory machine readable storage medium of Example 23, further comprising instructions that when executed perform: decoding, at the UE, the DCI, wherein the DCI includes one or more explicit bits indicating the one or more BWPs for which CSI reporting is to be provided by the UE; or decoding, at the UE, the DCI, wherein the DCI indicates that a BWP of the one or more BWPs that carries the DCI is configured to calculate and report a semi-persistent CSI.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for channel state information (CSI) reporting, the apparatus comprising:
one or more processors configured to:

decode, at the UE, CSI reporting settings to configure the UE to calculate CSI to generate two or more CSI reports;

determine, at the UE, a subset of the two or more CSI reports, wherein the subset of the two or more CSI reports has a maximum payload size that is less than an available payload size, wherein the subset is selected according to a predetermined rule; and encode, at the UE for transmission to a next generation node B (gNB), the subset of the two or more CSI reports; and a memory interface configured to send the subset of the two or more CSI reports to a memory.

2. The apparatus of claim 1, wherein the one or more processors are further configured to:

decode, at the UE, CSI reporting settings to configure the UE to calculate CSI to generate the two or more CSI reports, wherein each CSI reporting setting is associated with a single downlink (DL) bandwidth part (BWP).

3. The apparatus of claim 1, wherein the one or more processors are further configured to:

decode, at the UE, downlink control information (DCI) that includes a trigger for aperiodic CSI reporting for one or more bandwidth parts (BWPs).

4. The apparatus of claim 1, wherein the one or more processors are further configured to:

decode, at the UE, DCI that indicates an active BWP, wherein the active BWP is configured to provide CSI reporting.

5. The apparatus of claim 1, wherein the one or more processors are further configured to:

decode, at the UE, a radio resource control (RRC) signal that includes information indicating a single downlink (DL) bandwidth part (BWP) associated with each CSI reporting setting.

6. The apparatus of claim 1, wherein the one or more processors are further configured to:

decode, at the UE, downlink control information (DCI) that includes a trigger for semi-persistent CSI reporting for an active bandwidth part (BWP).

7. The apparatus of claim 1, wherein the one or more processors are further configured to:

select, at the UE, the subset of the two or more CSI reports according to the predetermined rule, wherein the predetermined rule is based on a serving cell index.

8. The apparatus of claim 1, wherein the one or more processors are further configured to:

select, at the UE, the subset of the two or more CSI reports according to the predetermined rule, wherein the predetermined rule is based on an index of a CSI reporting setting.

9. The apparatus of claim 1, wherein the UE includes an antenna, a touch sensitive display screen, a speaker, a microphone, a graphics processor, an application processor, an internal memory, a non-volatile memory port, or combinations thereof.

10. An apparatus of a next generation node B (gNB) operable for channel state information (CSI) reporting, the apparatus comprising:

one or more processors configured to:

encode, at the gNB, CSI reporting settings to configure a user equipment (UE) to calculate CSI to generate two or more CSI reports;

encode, at the gNB, two or more CSI reports, wherein a subset of the two or more CSI reports has a maximum payload size that is less than an available payload size, wherein the subset is selected at the UE according to a predetermined rule;

decode, at the gNB, the subset of the two or more CSI reports; and a memory interface configured to send the subset of the two or more CSI reports to a memory.

11. The apparatus of claim 10, wherein the one or more processors are further configured to:

encode, at the gNB, CSI reporting settings to configure the UE to calculate CSI to generate the two or more CSI reports, wherein each CSI reporting setting is associated with a single downlink (DL) bandwidth part (BWP).

12. The apparatus of claim 10, wherein the one or more processors are further configured to:

encode, at the gNB, downlink control information (DCI) that includes a trigger for aperiodic CSI reporting for one or more bandwidth parts (BWPs).

13. The apparatus of claim 10, wherein the one or more processors are further configured to:

encode, at the gNB, DCI that indicates an active BWP, wherein the active BWP is configured to provide CSI reporting.

14. The apparatus of claim 10, wherein the one or more processors are further configured to:

encode, at the gNB, a radio resource control (RRC) signal that includes information indicating a single downlink (DL) bandwidth part (BWP) associated with each CSI reporting setting.

15. The apparatus of claim 10, wherein the one or more processors are further configured to:

encode, at the gNB, downlink control information (DCI) that includes a trigger for semi-persistent CSI reporting for an active bandwidth part (BWP).

16. At least one non-transitory machine readable storage medium having instructions embodied thereon for channel state information (CSI) reporting, the instructions when executed by one or more processors at a user equipment (UE) perform the following:

decoding, at the UE, CSI reporting settings to configure the UE to calculate CSI to generate two or more CSI reports;

determining, at the UE, a subset of the two or more CSI reports, wherein the subset of the two or more CSI reports has a maximum payload size that is less than an available payload size, wherein the subset is selected according to a predetermined rule; and encoding, at the UE for transmission to a next generation node B (gNB), the subset of the two or more CSI reports.

17. The at least one non-transitory machine readable storage medium of claim 16, further comprising instructions that when executed perform:

decoding, at the UE, CSI reporting settings to configure the UE to calculate CSI to generate the two or more CSI reports, wherein each CSI reporting setting is associated with a single downlink (DL) bandwidth part (BWP).

18. The at least one non-transitory machine readable storage medium of claim 16, further comprising instructions that when executed perform:

decoding, at the UE, downlink control information (DCI) that includes a trigger for aperiodic CSI reporting for one or more bandwidth parts (BWPs).

19. The at least one non-transitory machine readable storage medium of claim 16, further comprising instructions that when executed perform:

decoding, at the UE, DCI that indicates an active BWP, wherein the active BWP is configured to provide CSI reporting.

20. The at least one non-transitory machine readable storage medium of claim 16, further comprising instructions that when executed perform:
    decoding, at the UE, a radio resource control (RRC) signal that includes information indicating a single downlink (DL) bandwidth part (BWP) associated with each CSI reporting setting.

21. The at least one non-transitory machine readable storage medium of claim 16, further comprising instructions that when executed perform:
    decoding, at the UE, downlink control information (DCI) that includes a trigger for semi-persistent CSI reporting for an active bandwidth part (BWP).

22. The at least one non-transitory machine readable storage medium of claim 16, further comprising instructions that when executed perform:
    selecting, at the UE, the subset of the two or more CSI reports according to the predetermined rule, wherein the predetermined rule is based on a serving cell index.

23. The at least one non-transitory machine readable storage medium of claim 16, further comprising instructions that when executed perform:
    selecting, at the UE, the subset of the two or more CSI reports according to the predetermined rule, wherein the predetermined rule is based on an index of a CSI reporting setting.

* * * * *